(12) United States Patent
Moliere

(10) Patent No.: US 9,556,393 B2
(45) Date of Patent: Jan. 31, 2017

(54) METHODS OF OPERATING A GAS TURBINE TO INHIBIT VANADIUM CORROSION

(71) Applicant: General Electric Company, Schenectady, NY (US)

(72) Inventor: Michel Marie Raymond Moliere, Belfort (FR)

(73) Assignee: General Electric Company, Schenectady, NY (US)

( * ) Notice: Subject to any disclaimer, the term of this patent is extended or adjusted under 35 U.S.C. 154(b) by 711 days.

(21) Appl. No.: 14/067,436

(22) Filed: Oct. 30, 2013

(65) Prior Publication Data

US 2014/0315136 A1 Oct. 23, 2014

(51) Int. Cl.
| | | |
|---|---|---|
| *F02C 3/20* | (2006.01) | |
| *C10L 10/04* | (2006.01) | |
| *F02C 3/24* | (2006.01) | |
| *F23J 7/00* | (2006.01) | |
| *C10L 1/10* | (2006.01) | |
| *C10L 1/12* | (2006.01) | |
| *F02C 7/30* | (2006.01) | |
| *F02C 3/30* | (2006.01) | |
| *C10L 1/28* | (2006.01) | |
| *C10L 1/30* | (2006.01) | |

(52) U.S. Cl.
CPC .................. *C10L 10/04* (2013.01); *C10L 1/10* (2013.01); *C10L 1/1233* (2013.01); *F02C 3/24* (2013.01);
(Continued)

(58) Field of Classification Search
CPC .................. F02C 3/24; F02C 3/30; F02C 7/30; F23J 7/00; C10L 1/28; C10L 1/301; C10L 1/1233; C10L 1/1291; C10L 10/04; C10L 2200/024; C10L 2200/0213; C10L 2200/0218; C10L 2200/0222; C10L 2200/0272; C10L 2200/0438

See application file for complete search history.

(56) References Cited

U.S. PATENT DOCUMENTS

| 3,738,819 A | 6/1973 | Milner et al. |
|---|---|---|
| 3,994,699 A | 11/1976 | Scott |

(Continued)

FOREIGN PATENT DOCUMENTS

| CH | 307980 | 6/1955 |
|---|---|---|
| EP | 2236585 A1 | 10/2010 |

(Continued)

OTHER PUBLICATIONS

GB Search Report and Written Opinion issued in connection with corresponding GB Application No. GB1410018.4 dated Dec. 4, 2014.

*Primary Examiner* — Lorne Meade
(74) *Attorney, Agent, or Firm* — Armstrong Teasdale LLP

(57) ABSTRACT

A method of inhibiting vanadic corrosion of a hot part of a gas turbine system is provided. The method includes introducing, in the combustor, a first oxide comprising magnesium oxide (MgO) and at least one second oxide from among $Al_2O_3$, $Fe_2O_3$, $TiO_2$ and $SiO_2$. A ratio "m" of a number of moles of MgO to a number of moles of $V_2O_5$ and a ratio "a" of a total number of moles of the at least one second oxide to the number of moles of $V_2O_5$ satisfy two conditions based on a firing temperature of the expansion turbine, an average density of one or more double oxides formed by a reaction between MgO and the at least one second oxide, and an average Knoop hardness of the one or more double oxides formed by the reaction between MgO and the at least one second oxide.

20 Claims, 2 Drawing Sheets

(52) U.S. Cl.
CPC . *F02C 3/30* (2013.01); *F02C 7/30* (2013.01); *F23J 7/00* (2013.01); *C10L 1/1291* (2013.01); *C10L 1/28* (2013.01); *C10L 1/301* (2013.01); *C10L 2200/024* (2013.01); *C10L 2200/0213* (2013.01); *C10L 2200/0218* (2013.01); *C10L 2200/0222* (2013.01); *C10L 2200/0272* (2013.01); *C10L 2200/0438* (2013.01); *C10L 2270/04* (2013.01); *C10L 2290/58* (2013.01); *C10L 2290/60* (2013.01)

(56) References Cited

U.S. PATENT DOCUMENTS

| | | |
|---|---|---|
| 4,047,875 A | 9/1977 | May et al. |
| 5,120,695 A | 6/1992 | Blumrich et al. |
| 6,197,075 B1 * | 3/2001 | Muir .................... C07C 51/414 44/331 |
| 8,282,693 B2 | 10/2012 | Moliere et al. |
| 9,267,087 B2 * | 2/2016 | Moliere ................ C10L 1/1208 |
| 2010/0199546 A1 | 8/2010 | Gilmurray |
| 2011/0056209 A1 | 3/2011 | Moliere et al. |
| 2013/0213282 A1 | 8/2013 | Meskers, Jr. et al. |
| 2015/0083165 A1 * | 3/2015 | Moliere ................ F01D 25/002 134/22.14 |
| 2015/0300263 A1 * | 10/2015 | Sokolov .................... F02C 7/30 60/772 |

FOREIGN PATENT DOCUMENTS

| | | |
|---|---|---|
| GB | 697101 | 9/1953 |
| GB | 762521 | 11/1956 |
| GB | 764752 | 1/1957 |
| WO | 9951707 A1 | 10/1999 |

* cited by examiner

METHODS OF OPERATING A GAS TURBINE TO INHIBIT VANADIUM CORROSION

CROSS-REFERENCE TO RELATED APPLICATION

This application claims priority to French patent application Serial No. 13 53692, entitled "PROCEDE METTANT EN OEUVRE DES ADDITIFS BIMETALLIQUES POUR L'INHIBITION DE LA CORROSION VANADIQUE DANS DES TURBINES A GAZ" (Process Involving Bi-metallic Additives for Inhibiting the Vanadic Corrosion in Gas Turbines), filed Apr. 23, 2013, the disclosure of which is incorporated herein by reference in its entirety.

BACKGROUND OF THE INVENTION

The field of the disclosure relates generally to combustion of a vanadium-contaminated liquid fuel in a gas turbine combustion system, and more particularly to protecting against vanadium corrosion and reducing the fouling of the hot parts of such gas turbines, while preventing any erosion phenomena, during operation.

The "hot parts" of a gas turbine are those of its components which are in contact with the combustion gas. In known gas turbines, these combustion gases have a speed of several hundred meters per second and temperatures exceeding 1000° C. The hot parts, which are made of super-alloys (in general, nickel-based) and can be covered with ceramic coatings (for example, anti-corrosion coatings and/or thermal barriers), typically include the components of the combustion system (such as combustion liners, transition pieces, and the like) and, downstream in the direction of the flow of the combustion gas, the static ("partition vanes" or "nozzles") and rotating ("buckets" or "blades") components of the expansion turbine.

When a gas turbine burns petroleum fractions of degraded qualities, such as heavy oils, distillation residues and other refining by-products (e.g. HCO), its hot parts can be subjected to three main types of damage: hot corrosion, fouling due to the formation of deposits, and erosion. With regard to corrosion, the oxidation of the vanadyl-porphyrins that are present in these fuels generate ash that is corrosive towards the materials of the hot parts. This form of corrosion, called "vanadic corrosion," is caused by the formation in the flames of vanadium compounds of degree of oxidation (5) having low melting point (Tf), such as vanadium pentoxide ($V_2O_5$: Tf=675° C.) in free form or combined with alkaline metals such as alkaline meta-vanadate ($NaVO_3$: Tf=628° C.; $KVO_3$: Tf=517° C.). These compounds are transported in liquid state by the combustion gas from the combustion system towards the turbine, and the fraction which is deposited on the hot parts can cause severe electrochemical attacks that are characteristic of molten electrolytic media. When the gas turbine operates at full regime, the thermal environment of the hottest parts, typically the first stage nozzles of the turbine, is characterized by the "firing temperature," which does not refer to the temperature existing in the flames but designates that of the combustion gases at their entry in the expansion turbine; it represents a particularly important design parameter of the gas turbines as it determines its maximum efficiency.

The vanadic corrosion can be inhibited by chemically trapping $V_2O_5$ within refractory and chemically stable compounds which suppress the molten electrolytic medium and, therefore, this form of high temperature corrosion. In this regard, magnesium salts constitute very good inhibitors. When injected in the combustion chamber, they react with the vanadium compounds to form magnesium orthovanadate, $Mg_3V_2O_8$, whose melting point is 1170° C., according to the reaction:

$$3MgO+V_2O_5 \rightarrow Mg_3V_2O_8 \quad (1)$$

The inhibitor must be injected in sufficient quantity for, on the one hand, trapping all the vanadium brought by the fuel and, on the other hand, forming the orthovanadate rather than a vanadate less rich in magnesium, such as the pyro-vanadate $Mg_2V_2O_7$ (Tf: 980° C.) or the meta-vanadate $MgV_2O_6$ (Tf: 742° C.), which are less refractory than the orthovanadate. The minimum theoretical value of the molar ratio ($MgO/V_2O_5$) ensuring the formation of orthovanadate $Mg_3V_2O_8$ is 3. However, an excess of magnesium is required to obtain a good anti-corrosion protection. The inhibition reaction is in general written as:

$$mMgO+V_2O_5 \rightarrow Mg_3V_2O_8+(m-3)MgO \quad (2a)$$

In this equation, "m" refers to the molar ratio ($MgO/V_2O_5$) and will also be called "dosage ratio"; the excess of magnesium, defined as "e," amounts to:

$$e=m-3. \quad (3)$$

Thus, the equation (2a) can also be written:

$$(3+e)MgO+V_2O_5 \rightarrow Mg_3V_2O_8+eMgO \quad (2b)$$

In practice a high value of excess magnesium, and consequently a high value of the dosage ratio "m," is necessary for, on the one hand, strictly guaranteeing the reliability of the anti-corrosion protection, and on the other hand, forcing the formation of $Mg_3V_2O_8$ and reducing that of $Mg_2V_2O_7$. Thus, one requires m=12.6 moles of MgO (instead of 3 theoretically) per mole of $V_2O_5$, or in weight terms, 3 grams of Mg per gram of V (i.e., an Mg/V ratio equal to 3 by weight). The equation of the corresponding inhibition reaction, which will be called the "conventional inhibition" or "conventional method" of inhibition, is written as:

$$12.6MgO+V_2O_5 \rightarrow Mg_3V_2O_8+9.6MgO \quad (2c)$$

The problem of fouling of the hot parts of the gas turbines by deposits of $Mg_3V_2O_8$ and MgO, as well as the "dry cleaning" methods by injection of friable particles and the "wet methods" based on washing of the turbine with water, are described in European Patent No. 2,236,585, issued May 16, 2012, the disclosure of which is incorporated herein by reference in its entirety. The physical and chemical change of these deposits is complicated by the fact that a balance of sulfation/desulfation of MgO is established at high temperature, according to the reversible equation (4):

$$MgSO_4 \rightarrow MgO+SO_3. \quad (4)$$

When the temperature rises, the magnesium sulfate, which is water soluble, tends to desulfate and be replaced with magnesium oxide, which is neither soluble in water nor in any chemical reagent compatible with the turbine materials. Moreover, this desulfation is accompanied by a physical contraction and an agglomeration of the deposit which tends to sinter and thus become more adhering and more difficult to dissolve and to disintegrate mechanically. Therefore, when the firing temperature of the turbine is increased, the high magnesium excess used in the conventional method leads to an increased fouling by MgO and increased difficulty in cleaning the hot parts. In practice, when the temperature exceeds approximately 1090° C., the deposits of magnesium-vanadium ash can no longer be removed from the hot parts, either by dry cleaning (an operation carried out "on-line"), nor by washing with water (an operation carried out "off-line"). This temperature level of 1090° C. represents a barrier for the efficiency of gas turbines burning fuels contaminated with vanadium and inhibited with magnesium, even though known gas turbines can operate at firing temperatures lying between 1140° C. (second generation machines or "E class") and 1430° C. (third generation machines or "F class") when the fuel is very pure. Moreover, because the power decreases in a virtually linear manner with the rate of fouling of the turbine, there is an obvious interest in reducing the deposition of ash even when the temperature is maintained at 1090° C.

Considering the limits of the inhibition methods which have been set out, it is desirable to provide new methods that: (i) ensure anti-corrosion protection at least as effective as that provided by the conventional method; (ii) generate minimum quantities of deposits which must moreover be easily removable, preferably according to an "on line" process that does not degrade the availability of the machine; and (iii) do not cause an issue regarding erosion of the hot parts. These three criteria, which must be satisfied up to the highest possible limit temperature to optimize the efficiency, constitute the "advanced inhibition objective."

BRIEF DESCRIPTION OF THE INVENTION

In one aspect, a method of inhibiting vanadic corrosion of a hot part of a gas turbine system is provided. The gas turbine system includes an expansion turbine and a combustor, and the combustor burns a fuel contaminated with vanadium such that vanadium pentoxide ($V_2O_5$) is formed. The method includes introducing, in the combustor, a first oxide comprising magnesium oxide (MgO) and at least one second oxide from among $Al_2O_3$, $Fe_2O_3$, $TiO_2$ and $SiO_2$. A ratio "m" of a number of moles of MgO to a number of moles of $V_2O_5$ and a ratio "a" of a total number of moles of the at least one second oxide to the number of moles of $V_2O_5$ satisfy the two conditions:

$$a+3<m<15;\text{ and} \quad (i)$$

$$[1/(1+K)](m-2)<a<[10/(10+K)](m-2); \quad (ii)$$

where K is defined by the relation $K=MV*HK*e^{(-0.056*T)}$, T is a firing temperature of the expansion turbine, MV is an average density of one or more double oxides formed by a reaction between MgO and the at least one second oxide, and HK is an average Knoop hardness of the one or more double oxides formed by the reaction between MgO and the at least one second oxide.

In another aspect, a method of reducing the formation of deposits in a gas turbine system is provided. The gas turbine system includes an expansion turbine and a combustor, and the combustor burns a fuel contaminated with vanadium such that vanadium pentoxide ($V_2O_5$) is formed. The method includes introducing, in the combustor, a first oxide comprising magnesium oxide (MgO) and at least one second oxide from among $Al_2O_3$, $Fe_2O_3$, $TiO_2$ and $SiO_2$. A ratio "m" of a number of moles of MgO to a number of moles of $V_2O_5$ and a ratio "a" of a total number of moles of the at least one second oxide to the number of moles of $V_2O_5$ satisfy the two conditions:

$$a+3<m<15;\text{ and} \quad (i)$$

$$[1/(1+K)](m-2)<a<[10/(10+K)](m-2); \quad (ii)$$

where K is defined by the relation $K=MV*HK*e^{(-0.056*T)}$, T is a firing temperature of the expansion turbine, MV is an average density of one or more double oxides formed by a reaction between MgO and the at least one second oxide, and HK is an average Knoop hardness of the one or more double oxides formed by the reaction between MgO and the at least one second oxide.

DETAILED DESCRIPTION OF THE INVENTION

Figure 1:
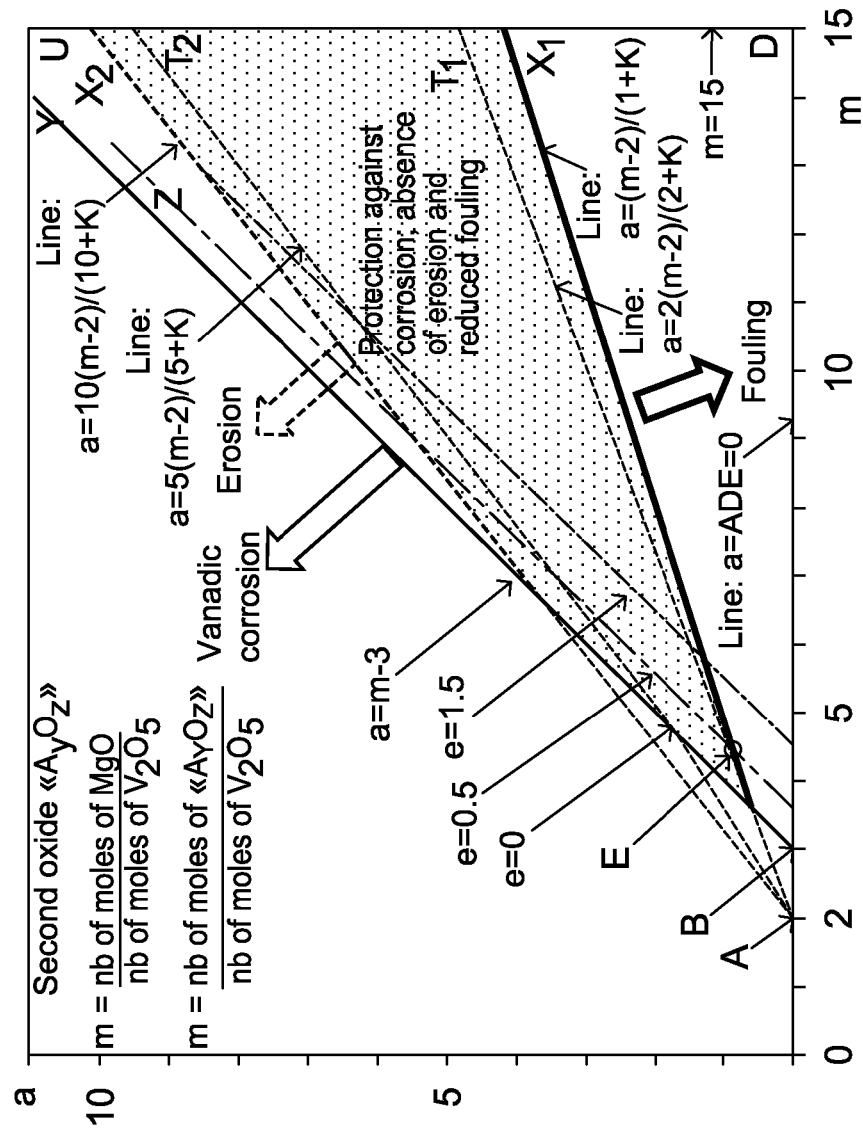
FIG. 1 is a diagram showing an embodiment of the invention pertaining to ratios of vanadium, magnesium, and a second oxide.

The exemplary methods described herein are for use in a combustion process using a liquid fuel contaminated with vanadium in a combustion system of a gas turbine fitted with an expansion turbine, the combustion leading to the formation of vanadium pentoxide ($V_2O_5$), wherein the method inhibits the vanadic corrosion of a hot part of the gas turbine. Embodiments of the invention provide advantages in inhibiting the vanadic corrosion of a hot part of the gas turbine and simultaneously reducing the formation of deposits, while preventing the erosion of the hot part. Other characteristics and advantages of the invention will appear more clearly on reading of the following description, which provides illustrative and non-restrictive examples and embodiments, and on referring to the attached figures, which present two useful graphs for understanding the method according to the invention.

European Patent No. 2,236,585, referenced above, describes one method of attaining the advanced inhibition objective, based on the use of some "double oxides with magnesium," that is, combinations between MgO (the "first oxide") and a "second oxide" with the generic formula of $A_yO_z$, in which:

A (referred to as "E" in European Patent No. 2,236,585) refers to a "second element" such as boron, aluminum, titanium, zirconium, silicon, iron or cerium, boron being the preferred "second element"; and y and z are two positive numbers.

The chemical mechanism of inhibition by these double oxides, as described in European Patent No. 2,236,585, is based on the reaction:

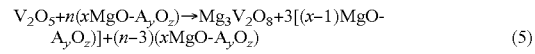
$$V_2O_5+n(xMgO-A_yO_z)\rightarrow Mg_3V_2O_8+3[(x-1)MgO-A_yO_z]+(n-3)(xMgO-A_yO_z) \quad (5)$$

where the number n is greater than or equal to 3. It is important to underline that in the inhibition strategy corresponding to equation (5), all the magnesium used in the inhibition reaction becomes engaged in the double oxide ($xMgO-A_yO_z$), which supposes the existence of a fixed ratio x between the number of moles of MgO and $A_yO_z$. For example, in the case of a double oxide of stoichiometry MgO—$Al_2O_3$ (or $MgAl_2O_4$), then x=1 and the number of moles of $Al_2O_3$ to be introduced is identical to the number of moles of MgO.

In the current invention, particular interest is paid to the use of the following four "second oxides": alumina ($Al_2O_3$), ferric oxide ($Fe_2O_3$), silica ($SiO_2$) and titanium oxide ($TiO_2$), due to their strong refractory character (i.e., high melting points) which are favorable for substantial increases of the firing temperature.

The inhibition strategy selected in this invention is different from the restrictive formulation of the equation (5), in which the quantities of magnesium oxide and of second oxide to engage are necessarily in the molar ratio x. The double oxides generated by MgO and these four second oxides are generically written: $MgO-A_yO_z$ or $MgA_yO_{z+1}$. Finally, a certain excess "e" of free magnesium oxide is introduced to ensure the reliability of inhibition. The generic formulation used is thus:

$$V_2O_5 + mMgO + aA_yO_z \rightarrow Mg_3V_2O_8 + eMgO + aMgA_yO_{z+1} \quad (6)$$

where:
the "second oxide" $A_yO_z$ can be: $Al_2O_3$ (y=2; z=3), $Fe_2O_3$ (y=2; z=3), $SiO_2$ (y=1; z=2), or $TiO_2$ (y=1; z=2);
"a" designates the ratio of the number of moles of $A_yO_z$ introduced to the number of moles of $V_2O_5$; it is also the ratio of the number of moles of $MgA_yO_{z+1}$ formed to the number of moles of $V_2O_5$;
"m" is the "dosage ratio" which designates, as in the equation (2a), the ratio of the number of moles of MgO used to the number of moles of $V_2O_5$; based on the balance of the atoms of magnesium in the equation (6), m can be written as:

$$m = 3 + a + e \quad (7)$$

the parameter "e", which expresses "the excess of magnesium" selected, is equal to the ratio of the number of moles of MgO remaining after reaction to the number of moles of the initial $V_2O_5$; as this magnesium excess must be positive, a result is that:

$$m > a + 3 \quad (8)$$

This new inhibition method, based on the generic equation (6), will be described as the inhibition "method with double oxides." It is defined by the choice of the second oxide $A_yO_z$ and by the choice of a formulation (m MgO+a $A_yO_z$), that is, by the coefficients "a" and "m." In equation (6), the association of the $Mg_3V_2O_8$ and MgO phases represents the "primary ash" or the "vanadic magnesium ash," which is formed even in the absence of the second oxide (i.e., the case where a=0), whereas the double oxide phase $MgA_yO_{z+1}$ represents the "additional ash" resulting from the addition of the second oxide.

When applied to each of the four "second oxides," equation (6) becomes:

$$V_2O_5 + (3+a+e)MgO + aAl_2O_3 \rightarrow Mg_3V_2O_8 + eMgO + aMgAl_2O_4; \quad (6a)$$

$$V_2O_5 + (3+a+e)MgO + aFe2O3 \rightarrow Mg_3V_2O_8 + eMgO + aMgFe_2O_4; \quad (6b)$$

$$V_2O_5 + (3+a+e)MgO + aSiO_2 \rightarrow Mg_3V_2O_8 + eMgO + aMgSiO_3; \quad (6c)$$

$$V_2O_5 + (3+a+e)MgO + aTiO2 \rightarrow Mg_3V_2O_8 + eMgO + aMgTiO_3. \quad (6d)$$

The four double oxides formed belong to the category of ceramics, that is, $Mg_2AlO_4$ is a spinel; $MgFe_2O_4$ is a magnesioferrite; $MgSiO_3$ is an enstatite, and $MgTiO_3$ is a geikielite.

An advantage of embodiments of the invention is a process using these four second oxides while realizing the advanced inhibition objective.

An embodiment of a method according to the invention includes introducing, in the combustion system, a first oxide which is magnesium oxide and at least one second oxide selected from among $Al_2O_3$, $Fe_2O_3$, $TiO_2$ and $SiO_2$, the ratio "m" of the number of moles of MgO to the number of moles of $V_2O_5$ and the ratio "a" of the total number of moles of second oxide(s) to the number of moles of $V_2O_5$ satisfying the two conditions:

$$a + 3 < m < 15; \text{ and}$$

$$[1/(1+K)](m-2) \le a \le [10/(10+K)](m-2);$$

where K is defined by the relation: $K = MV \cdot HK \cdot e^{(-0.0056 \cdot T)}$, in which:
MV and HK respectively designate the average density and average Knoop hardness of the double oxides formed by the reaction between magnesium oxide and second oxides, as described below; and
T is a characteristic temperature, as described below, which defines the conditions of exposure of the hot parts to vanadic corrosion.
The ratios "m" and "a" can satisfy the relation: $m \ge a+3.5$.
Preferably, the parameters "m" and "a" can satisfy the relation:

$$[2/(2+K)](m-2) \le a \le [5/(5+K)](m-2).$$

In a more preferred embodiment, m=9 and a=4.5.
The second oxide used can be $Al_2O_3$ and, considering the corresponding values of the parameters MV, HK and T indicated below for the double oxide $MgAl_2O_4$, the ratios "m" and "a" can then satisfy the relation:

$$0.343(m-2) \le a \le 0.839(m-2).$$

Alternatively, the second oxide used can be $Fe_2O_3$ and, considering the corresponding values of the parameters MV, HK and T indicated below for the double oxide $MgFe_2O_4$, the ratios "m" and "a" can then satisfy the relation:

$$0.408(m-2) \le a \le 0.874(m-2).$$

Alternatively, the second oxide used can be $TiO_2$ and, considering the corresponding values of the parameters MV, HK and T indicated below for the double oxide $MgTiO_3$, the ratios "m" and "a" can then satisfy the relation:

$$0.563(m-2) \le a \le 0.928(m-2).$$

Alternatively, the second oxide used can be $SiO_2$ and, considering the corresponding values of the parameters MV, HK and T indicated below for the double oxide $MgSiO_3$, the ratios "m" and "a" can then satisfy the relation:

$$0.617(m-2) \le a \le 0.942(m-2).$$

It is possible to draw a parallel between the equations (6) (i.e., (6a) to (6d)) concerning the method according to the invention and the previous method related to the inhibition by double magnesium/boron oxides as is described in European Patent No. 2,236,585, that is:

$$V_2O_5 + (3+2b)MgO + bB_2O_3 \rightarrow Mg_3V_2O_8 + bMg_2B_2O_5. \quad (9)$$

The applicant has observed that there are great differences, particularly in terms of implementation modes, between the present inhibition method involving the "four second oxides" and the previous one based on the use of boron oxide according to the equation (9) as described in European Patent No. 2,236,585. On the one hand, in equation (9) where parameter "b" determines the $B_2O_3$/MgO ratio, there is no free MgO after reaction. The boron oxide, associated with magnesium, leads to the formation of double magnesium/boron oxides having special anti-deposition properties which, advantageously used as described in European Patent No. 2,236,585, allows reducing the formation of ash deposits, even with low values of "b," without creating an erosion effect of the hot parts, even for high values of "b."

In the case of the "four second oxides," the situation is very different: Inventor has observed that "the inhibition objective" is obtained only over some defined ranges of the parameters "m" and "a." In order to describe the results obtained, it is useful to introduce two data:
- the "vanadium deposition rate" ("VDR," expressed as a percentage) is defined as the product by 100 of the ratio between the vanadium mass deposited on a given surface over a given period to the vanadium mass projected against this same surface for the same period, knowing that for conventional methods, VDR ranges between 18 percent to 25 percent according to the experimental conditions.
- the "anti-deposition efficiency" of a formulation with double oxides, noted "ADE," characterizes the gain, in terms of reduction of deposits, of a given formulation (m MgO+a $A_yO_z$) with regard to the conventional inhibition method:

$$ADE = 100 * \left[ 1 - \frac{\text{quantity of vanadium deposited with the method } (mMgO + aA_yO_z) \text{according to (6)}}{\text{quantity of vanadium deposited with the conventional method according to} (2c)} \right] \quad (10)$$

From a formal point of view, if the efficiency criteria ADE is equal to zero, the reduction of deposits is null with regard to the conventional method, while an ADE value of 100 corresponds to the ideal case of the complete removal of deposits.

By using a high velocity burner rig allowing simulation of the speed levels that are encountered in gas turbines and which attain 600 m/s, the applicant has observed the following experimental facts:
- at constant temperature, the anti-deposition effect, as characterized by ADE, depends upon the following factors:
- the hardness of the double oxide particles: hard particles have a higher disintegration effect on the deposits on which they impinge;
- the density of the double oxide particles: solid particles having equal size but being denser have a greater kinetic energy and a greater anti-deposition efficiency due both to their higher impact effect and inertial effect of the other particles;
- the ratio between the number of moles of "additional ash" $MgA_yO_{z+1}$ and the number of moles of "primary ash," a relation that will be called the "modification ratio" of the ashes and will be noted "MR." A rising MR value not only leads to a rising dilution of the "primary phases" ($Mg_3V_2O_8$ and MgO) by the "additional phase" (double oxide) but also increases the inertial effect created by the double oxide particles; by considering the balance of the reaction products of the equation (6), MR can be written:

$$MR = a/(3+e). \quad (11)$$

Additionally, by taking into account equation (7), it can also be written:

$$MR = a/(m-a-2). \quad (12)$$

Accordingly, for a given second oxide having a given hardness and density, the ADE criterion depends only on, and increases monotonously with, MR.

However, the ash "modification ratio" MR, and consequently the parameter "a," cannot be increased ad libitum since—in addition to an economic aspect related to the consumption of $A_yO_z$ and associated over-consumption of MgO—at a certain value of MR, there appears an undesirable erosion of the substrate (including an anti-corrosion coating and super-alloy, generally nickel based).

For a given set of MR, MV and HK data, the anti-deposition effect decreases with the temperature (probably due to the softening of the vanadic-magnesium phases around their solidus, causing them to become more "sticky").

The Inventor has established that when one of the four double oxides is used in the absence of boron, for operations within the typical range of combustion gas speed of gas turbines, the attainment of "the advanced inhibition objective," that is, the combined attainment, at high firing temperature, of anti-corrosion protection, absence of erosion and low deposition (with a representative efficiency of anti-deposition ADE chosen to be at least 50 percent), is conditioned by the following three criteria:
- in terms of anti-corrosion protection, one must ensure an excess of magnesium ("anti-corrosion criterion"):

$$e = m - a - 3 > 0. \quad (13)$$

The higher the excess of magnesium, the safer the inhibition effect, which becomes less sensitive to possible drift in the operation conditions of the gas turbine, due for example to under-evaluation of the vanadium content of the fuel (faulty fuel analysis). In an embodiment, the relation can be set to:

$$e = m - a - 3 \geq 0.5; \quad (14)$$

for a substantial reduction of ash deposition, one must satisfy a "low deposition criterion" or "non-fouling criterion":

$$MR*MV*HK*e^{(-0.0056*T)} > 1; \quad (15)$$

for the prevention of erosion of material, one must satisfy a "non-erosion criterion":

$$MR*MV*HK*e^{(-0.0056*T)} < 10; \quad (16)$$

where:
MV is the density of the double oxide, defined at ambient temperature, expressed in g/cm³;
HK is the Knoop hardness of the double oxide, defined by the ASTM E384 standard and also measured at ambient temperature, expressed in g/mm²; this property characterizes the hardness of materials with brittle rupture, such as ceramic that constitutes the double oxides $MgA_yO_{z+1}$. It will be noted that the "Mohs hardness" is of more common usage concerning ceramics; however, the Mohs scale is a simple classification of minerals from 1 to 10 and has no physical reality; its use in analytical correlation would thus be less legitimate.
"T" describes the "firing temperature" of the gas turbine considered; it will be noted that, without departing from the scope of the invention, we can take any other definition of the temperature "T" which will satisfactorily reflect the conditions of exposure to vanadic corrosion of gas turbine hot parts; for example, we can take the temperature of the combustion gas at the outlet of the combustion system, or alternatively, the temperature of a specific hot part, such as:
(i) the temperature of the liners or transition parts;
(ii) the temperature of the first stage nozzles;
(iii) the temperature of the first stage buckets;
(iv) the average between the temperature of combustion gas and any one of these three temperatures; or (v) one of these four temperatures increased by a safety increment (according to a possible deliberately conservative approach);

wherein each one of these temperatures can be understood as a surface temperature (or "skin temperature") or a temperature averaged through the depth or on the wall surface of the hot part, or a similar measure. These different choices correspond in fact to different "degrees of security" of the anti-corrosion protection: higher T values lead to higher values of the parameter "a" and, thus, to an increasing cost. The choice of taking the parameter "T" identical to the firing temperature ensures a good compromise between the safety of the anti-corrosion protection and the implementation cost of the inhibition.

Equation (15) expresses the following effect: when the "modification ratio" MR of ash is too low (i.e., for low values of "a") and the low deposition criterion is consequently not attained, the anti-deposition efficiency ADE of the second oxide is insufficient. Equation (16) translates into the following effect: when MR is very high and the non-erosion criterion is consequently no longer satisfied, preliminary signs of erosion of the substrates are detected; this initiation of erosion is caused by: (i) the generation of a greater number of particles for a given flow of vanadium, and (ii) the rising content of harder double oxide particles in the hot gas flow. The MR value (and the "a" value) from which this erosion of the substrate starts is determined by equation (16) and thus depends on the nature of the double oxide formed (density and hardness), as well as the temperature.

Moreover, even though an increase in the dosage ratio "m" improves the safety of inhibition by increasing the value of excess of magnesium "e," the Inventor has observed that, when "m" exceeds an upper limit of about 15, it is no longer possible to substantially reduce the formation of deposits relative to the level corresponding to the conventional method (m=12.6; a=0).

Thus, there is also the following condition:

$$m<15 \qquad (17)$$

In the embodiments discussed herein, the relation (17) will always be considered to be satisfied; this is because a dosage ratio of magnesium greater than or equal to 15 has no practical interest, not only due to the incapacity of controlling the fouling issue, but also due to the very high cost of inhibition resulting from it.

The MV, HK and T parameters can be grouped in a "physical factor" that characterizes the double oxide and expresses the effect of temperature:

$$K=MV*HK*e^{(-0.0056*T)} \qquad (18)$$

Considering the expression of MR in equation (12), the combined criteria (15) and (16) of low deposition and of non-erosion can be written:

$$1/K < \frac{a}{m-a-2} < 10/K \qquad (19)$$

or:

$$[1/(1+K)](m-2)<a<[10/(10+K)](m-2). \qquad (20)$$

The values of density, Knoop hardness and the "physical factor" of each of the four double oxides considered are listed in table 1 for a temperature T taken as 1090° C. (1363 K).

TABLE 1

Melting temperature, density, Knoop hardness of four double oxides and the "physical factor" K calculated for T = 1090° C. (1363 K).

| Double oxide (MgA$_y$O$_{z+1}$) (Parent second oxide: "A$_y$O$_z$") | MgAl$_2$O$_4$ (Al$_2$O$_3$) | MgFe$_2$O$_4$ (Fe$_2$O$_3$) | MgTiO$_3$ (TiO$_2$) | MgSiO$_3$ (SiO$_2$) |
|---|---|---|---|---|
| Melting temperature (° C.) | 2110 | 1750 | 1610 | 1550 |
| MV (density) [g/cm$^3$] | 3.6 | 4.6 | 4.0 | 3.2 |
| HK (Knoop hardness) [g/mm$^2$] | 1100 | 650 | 400 | 400 |
| K = MV * HK * e$^{(-0.0056*T)}$ | 1.918 | 1.448 | 0.775 | 0.620 |

When applied to each of the four second oxides, the combined criteria of low deposition/non-erosion (20) becomes:

$$0.343(m-2) \le a \le 0.839(m-2) \text{ for } Al_2O_3; \qquad (20a)$$

$$0.408(m-2) \le a \le 0.874(m-2) \text{ for } Fe_2O_3; \qquad (20b)$$

$$0.563(m-2) \le a \le 0.928(m-2) \text{ for } TiO_2; \qquad (20c)$$

$$0.617(m-2) \le a \le 0.942(m-2) \text{ for } SiO_2. \qquad (20d)$$

FIG. 1 shows a generic graph, established at constant temperature T, in which "m" is plotted on the abscissa and "a" on the ordinate, and on which the fields of attainment of the anti-corrosion, low deposition, and non-erosion criteria are drawn. Any point P of the abscissa "m" and of the ordinate "a" is representative of the inhibition formulation (m MgO+a A$_y$O$_z$). The condition (13) of non-corrosion indicates that point P must be located below the half-line BY that has the following equation:

$$a=m-3. \qquad (21)$$

Moreover, according to equation (12), lines of constant MR, or "iso-MR" lines, have as a generic equation:

$$a/(m-a-2)=\text{constant} \qquad (22a)$$

or:

$$a=p(m-2) \qquad (22b)$$

where "p" is a constant. The "iso-MR" lines are thus half-lines having slopes equal to "p" and having as origin the point A defined by the coordinates (m=2; a=0). Since, for a given double oxide and for a determined temperature, ADE depends only on MR, the iso-MR lines are also the iso-ADE lines, that is, the lines with constant anti-deposition efficiency. By comparing the equations (20) and (22b), it can be seen that:

the half-line AX$_1$, with a slope equal to [1/(1+K)] and which is an iso-ADE line, corresponds to the realization of the low deposition criterion (ADE≈50%);

the half-line AX$_2$ whose slope equals [10/(10+K)] and which is also an iso-ADE line, corresponds to the realization of the non-erosion criterion;

in order that a selected formulation (m, a) satisfies the double low deposition/non-erosion criterion, the slope "p" of the iso-MR line on which the representative point P (m, a) is located, must satisfy the double condition:

$$1/(1+K) \le p \le 10/(10+K). \qquad (23)$$

In other words, this AP line must be located in the field delimited by the half-lines AX$_1$ and AX$_2$. It will be noted that the slope [1/(1+K)] of the $AX_1$ line reduces when K increases, and vice versa: the harder and denser is the double oxide formed, the easier it is to counteract the effect of ash deposition. On the other hand, an increase in temperature which reduces K (see equation (18)) tends to increase the slope of $AX_1$: the hotter are the combustion gas and the part walls, the more difficult it is to counteract the effect of deposition of ash, probably due to the softening and more "sticky" nature of the vanadic magnesium phase.

If we now consider a half-line AX whose slope p increases from zero:
- for p=0 (i.e., a=0), there is no addition of second oxide and, when m=12.6, the conditions of the conventional inhibition method are met;
- for p<[1/(1+K)], the formulation protects against corrosion, provided that point P is located below the half-line BY, but it does not provide enough double oxide to reduce fouling in an acceptable manner (in other words: ADE<50 percent);
- for [1/(1+K)]≤p≤[10/(10+K)], the formulation protects against corrosion provided that point P is located below the half-line BY; it satisfies the low deposition criteria (ADE 50%) as well as the non-erosion criteria;
- for p>[10/(10+K)], the formulation protects against corrosion provided that point P is located below the half-line BY, but it becomes erosive;
- finally, for p>[10/(10+K)] and for any point P located above the half-line BY, there is simultaneously corrosion and erosion.

Figure 2:
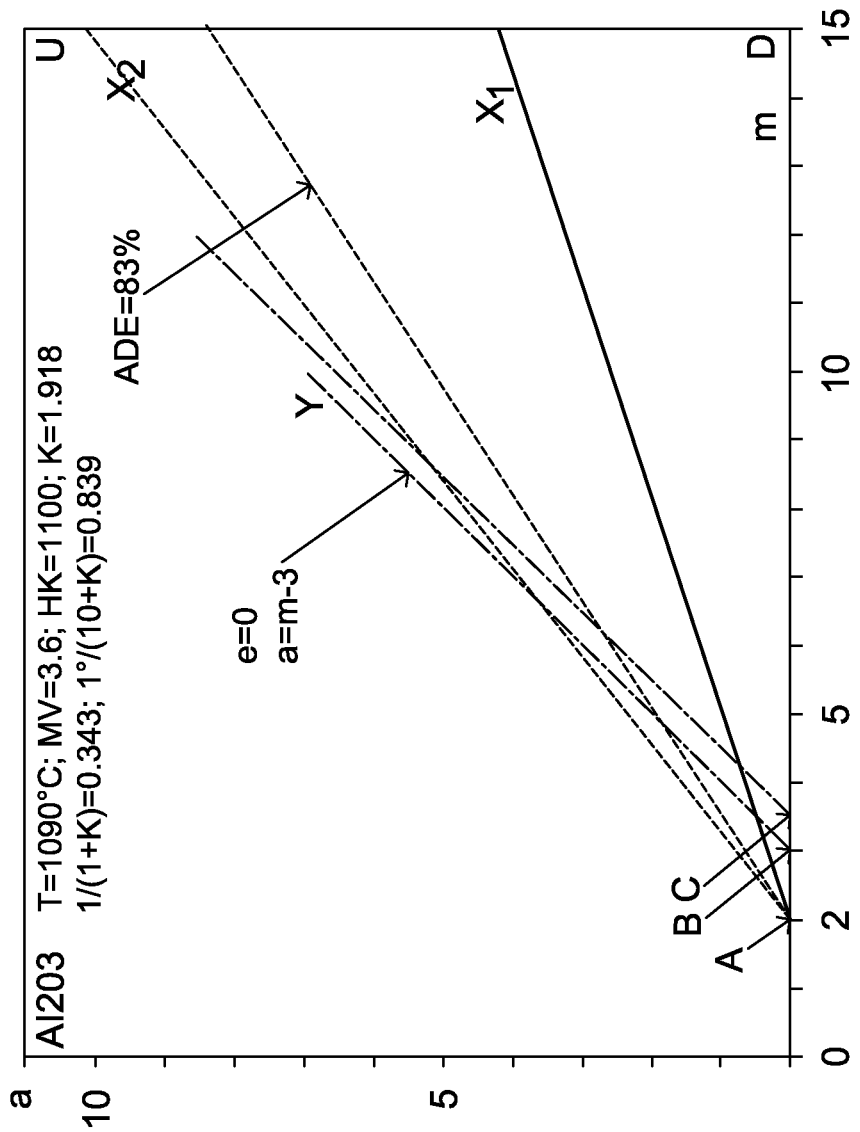
FIG. 2 is a diagram showing an embodiment of the invention pertaining to ratios of vanadium, magnesium, and an aluminum oxide.

FIG. 2 represents, by way of illustration, the application of this graph to the second oxide $Al_2O_3$.

From an experimental standpoint, Table 2 gathers a series of values of vanadium deposition rates (VDR) and anti-deposition efficiency (ADE) of several inhibition formulations.

TABLE 2 values of VDR and ADE obtained with certain inhibition formulations (T = 1090° C.)

| Second oxide | Inhibition formulation | VDR [%] | ADE [%] |
|---|---|---|---|
| None (conventional inhibition) | m = 12.6; a = 0 | 21 | 0 |
| $Al_2O_3$ | m = 9; a = 4.5 | 3.6 | 83 |
| $Fe_2O_3$ | m = 9; a = 4.5 | 4.2 | 80 |
| $TiO_2$ | m = 9; a = 4.5 | 5.3 | 75 |
| $SiO_2$ | m = 9; a = 4.5 | 6.1 | 71 |

Returning to FIG. 1, in embodiments of the method according to the invention, operating conditions preferably are selected to be at the left of the line DU representing the equation m=15 and, in addition, inside the "field of protection against corrosion, reduced fouling and absence of erosion" which is delimited by the half-lines BY, $AX_1$ and $AX_2$.

More particularly, in some embodiments, operating conditions are selected to be inside a zone included in this "field of protection against corrosion, reduced fouling and absence of erosion" zone which satisfies the following additional conditions:
- equation (14a), that is: a≤m−3.5, so as to have in the reaction products an excess "e" of magnesium of at least 0.5, ensuring a safety margin and making up for possible accidental under-evaluation of the vanadium content of the fuel; this condition is equivalent to saying that point P is located on, or to the right of, the half-line EZ having the equation: a=m−3.5;
- a≥2*(m−2)/(2+K), to ensure an anti-deposition efficiency, or ADE, better than 50 percent; this condition is equivalent to saying that point P is located on, or above, the half-line $AT_1$, which is the iso-ADE line having the equation: a=2*(m−2)/(2+K);
- a≤5*(m−2)/(5+K), to remain distant from the conditions where erosion begins; this condition is equivalent to saying that point P is located on, or below, the half-line $AT_2$, which is the iso-ADE line having the equation: a=5*(m−2)/(5+K).

The simultaneous realization of the two particular conditions above leads to:

$$[2/(2+K)](m-2) < a < [5/(5+K)](m-2) \tag{23}$$

More preferably, m=9 and a=4.5; this formulation corresponds to point P of the coordinates (9, 4.5).

The Inventor also has established that it is possible to use, instead of a single "second oxide," several "second oxides" taken from the same list {$Al_2O_3$; $Fe_2O_3$; $TiO_z$; $SiO_2$}. First, consider the case of the addition of two second oxides, noted $A^1_{y1}O_{z1}$ and $A^2_{y2}O_{z2}$. These two "second oxides" are introduced in "fixed proportions," in other words, the ratio between the number of moles of oxide $A^1_{y1}O_{z1}$ and that of oxide $A^2_{y2}O_{z2}$ remains constant in the inhibition method. If a "relative molar fraction" of the second oxide $A^i_{yi}O_{zi}$ is defined as the ratio of the number of moles of $A^i_{yi}O_{zi}$ to the total number of moles of the two second oxides introduced, denoted as "$x_i$," the expression "constant proportions" means that $x_1$ and $x_2$ are maintained constant in the inhibition method. The parameter "a" will represent in this case the total number of moles of the two second oxides divided by the number of moles of $V_2O_5$. In other words, if $a_1$ and $a_2$ respectively designate the number of moles of $A^1_{y1}O_{z1}$ and the number of moles of $A^2_{y2}O_{z2}$ divided by the number of moles of $V_2O_5$, then $a_1$ and $a_2$ satisfy the following equation:

$$a_1+a_2=a; \; a_1=x_1*a \text{ and } a_2=x_2*a; \text{ with } x_1 \text{ and } x_2=\text{constants and } x_1+x_2=1. \tag{24}$$

The inhibition equation becomes:

$$V_2O_5+mMgO+a*(x_1A^1_{y1}O_{z1}+x_2A^2_{y2}O_{z2}) \rightarrow Mg_3V_2O_8+eMgO+a*x_1MgA^1_{y1}O_{z1+1}+a*x_2MgA^2_{y2}O_{z2+1}. \tag{25}$$

The values of the molar mass, density, hardness and "physical factor" of the two corresponding double oxides, $MgA^1_{y1}O_{z1+1}$ and $MgA^2_{y2}O_{z2+1}$, are referred to respectively by $M_1$ and $M_2$; $MV_1$ and $MV_2$; $HK_1$ and $HK_2$; $K_1$ and $K_2$. The average density of the mixture of double oxides ($MgA^1_{y1}O_{z1+1}$—$MgA^2_{y2}O_{z2+1}$) can be calculated according to the formula:

$$MV=(x_1*M_1+x_2*M_2)/(x_1*M_1/MV_1+x_2*M_2/MV_2). \tag{26}$$

The average hardness of this same mixture of double oxides can be evaluated, as a first estimate, with the help of the formula:

$$HK=HK_1*x_1+HK_2*x_2. \tag{27}$$

The average "physical factor" of the mixture of double oxides is calculated with the help of the equation (17):

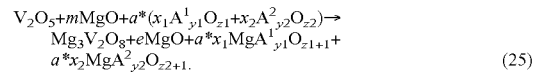

$$K=MV*HK*e^{(-0.0056*T)} \tag{17}$$

where the temperature T has the same definition as before.

It will be noted that the values of MV, HK and K given by these three equations depend on $x_1$ and $x_2$ and that in order for these values to be constant, $x_1$ and $x_2$ must each be constant. As in the case of a single "second oxide," it is the parameters "a" and "m" which govern the performance of inhibition. The attainment of "the advanced inhibition objective," that is, the combined realization of anti-corrosion protection, substantial reduction of deposits, and absence of erosion, is conditioned by the same criteria as in the case of a single second oxide:

for the anti-corrosion aspect, by the existence of an excess of magnesium ("anti-corrosion criterion"):

$$e=m-a-3>0 \quad (13)$$

where "a" is defined by the equation (24). In practice, one can take:

$$e \geq 0.5; \quad (14)$$

for the reduction of deposition and absence of erosion ("low deposition/non-erosion criterion"):

$$[1/(1+K)](m-2)<a<[10/(10+K)](m-2) \quad (19)$$

It will be noted that these equations are formally identical to those related to the case of a single second oxide. One can thus apply, in the case where two second oxides are used, the same general formulation strategy and the same preferred strategies as in the case of a single second oxide, taking the values of the parameters MV, HK and K calculated from equations (26), (27) and (17). For example, suppose that the two second oxides are: $A^1_{y1}O_{z1}=Al_2O_3$ and $A^2_{y2}O_{z2}=Fe_2O_3$ and that it is decided to introduce them with the following relative molar fractions: $x_1=0.4$ and $x_2=0.6$.

The application of equations (26), (27) and (17) to these values give:

$$MV=(x_1*M_1+x_2*M_2)/(x_1*M_1/MV_1+x_2*M_2/MV_2)=4.02$$

where $M_1$ and $M_2$ respectively describe the molar mass of the double oxides $MgAl_2O_4$ and $MgFe_2O_4$, with: $M_1=142.3$ g/mol and $M_2=200$ g/mol;

$$HK=HK_1*x_1+HK_2*x_2=830; \text{ and}$$

$$K=MV*HK*e^{(-0.0056*T)}=1.616 \text{ for } T=1090° C.$$

The combined condition of non-erosion/low deposition (equation (19)) becomes:

$$0.382*(m-2)<a<0.861*(m-2). \quad (19e)$$

Considering, for example, a special inhibition formulation based on these proportions of second oxides ($x_1=0.4$; $x_2=0.6$) with a=4.5 and m=9 results in, according to equation (24):

$$a_1=0.4*4.5=1.8 \text{ and } a_2=0.6*4.5=2.7.$$

For this specific formulation, the experimentation leads to, for T=1090° C., a value of VDR of 3.8% and, consequently, to a value of ADE of 82%. This case will be illustrated in one of the applied examples below.

It will be noted that the previous reasoning related to two double oxides can be generalized without difficulty in the case of more than two "second oxides" by modifying the equations (26), (27) as follows, with the equation (17) remaining unchanged:

$$MV=\Sigma[(x_i*M_i)/(x_i*M_i/MV_i)]; \quad (26b)$$

$$HK=\Sigma(x_i*HK_i) \quad (27b)$$

where $x_i$ refers to the "relative molar fraction" of the second oxide $A^i_{yi}O_{zi}$, as previously defined, and MV refers to the average density, HK refers to the average Knoop hardness, with the value of K being given by the relation (17).

The method according to embodiments of the invention is aimed at inhibiting the vanadic corrosion of gas turbine hot parts based on the use of magnesium oxide and other oxides $A^i_{yi}O_{zi}$ selected from the list $\{Al_2O_3; Fe_2O_3; TiO_2; SiO_2\}$.

In embodiments of the method, the vanadic corrosion of gas turbine hot parts is inhibited and their fouling is reduced, while avoiding their erosion, by adding, in the combustion system, an additive whose combustion products include magnesium oxide MgO and "second oxide(s)" which are taken from the list: $\{Al_2O_3; Fe_2O_3; TiO_2; SiO_2\}$ and are introduced in given relative molar fractions "$x_i$" the quantities of injected magnesium oxide and mixed oxides being such that: (i) the ratio "m" of the number of moles of MgO to the number of moles of $V_2O_5$, and (ii) the ratio "a" of the total number of moles of second oxides added to the number of moles of $V_2O_5$, satisfy the following conditions:

$$a-3<m<15 \quad (13)$$

and $$[1/(1+K)](m-2)<a<[10/(10+K)](m-2); \quad (17)$$

wherein the "physical factor" K is defined by the relation $$K=MV*HK*e^{(-0.0056*T)}, \text{ where:}$$

T is the firing temperature of the gas turbine; and
MV and HK respectively designate the average density and average Knoop hardness of the double oxides formed by the reaction between magnesium oxide and the second oxides.

According to a preferred mode of the invention, the ratios "m" and "a" satisfy the relation:

$$e=m-a-3 \geq 0.5. \quad (14)$$

According to a more preferred mode of the invention, "m" and "a" satisfy the double relation:

$$[2/(2+K)](m-2)<a<[5/(5+K)](m-2). \quad (23)$$

Still more preferably, the value of "m" is taken equal to 9 and that of "a" is taken equal to 4.5.

Example No. 1

A 40 megawatt gas turbine having a firing temperature of 1090° C. burns, at full load and in continuous operation, 10 tons per hour of a heavy fuel oil (HFO) containing 55 ppm of vanadium by weight. The application of the conventional inhibition method leads to injecting into the HFO 165 ppm of magnesium in the form of an oil soluble additive containing 20 percent magnesium by weight.

After 170 hours of operation at full load with this HFO, the gas turbine loses in average 8 percent of its capacity, which leads to performing a washing of the turbine every 170 hours (i.e., approximately every 7 days).

It is decided, without changing any gas turbine operation parameter (quality of HFO; operating point; firing temperature; etc.), to replace the conventional inhibition method by a method with double oxides, using iron as the second oxide, based on of the following equation:

$$V_2O_5+9MgO+4.5Fe_2O_3 \rightarrow Mg_3V_2O_8+4.5MgFe_2O_4+$$
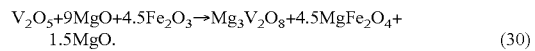
$$1.5MgO. \quad (30)$$

This corresponds to the case of inhibition in the presence of the double oxide $MgFe_2O_4$ (or "A"=Fe), with the parameters m=9 and a=4.5.

Table 2 indicates that for an inhibition in the presence of $Fe_2O_3$ performed with the parameters m=9 and a=4.5, the factor of anti-deposition efficiency is 80 percent or, in other words, that the mass of ash deposited is 4 times lower than with the conventional method.

In these conditions, the period of operation between washes increases from 170 to approximately 680 hours.

In practice, there is access, in addition to the 20% w/w magnesium additive mentioned above, to an oil soluble additive containing 20% of iron by weight.

According to equation (30), the atomic mass of V, Mg and Fe being respectively 50.9 g/at, 24.3 g/at and 55.8 g/at, the inhibition reaction requires, per gram of V:

9/2*24.3/50.9=2.14 grams of Mg; and (4.5*2)/2*55.8/50.9=4.93 grams of Fe.

As the heavy fuel contains 55 mg/kg of vanadium and the turbine consumption is 10 tons/hour, the magnesium and iron consumptions are, in kg/hour:

for magnesium: $55 \cdot 10^{-6} * 10 \cdot 10^{4} * 2.14 = 1.68$ kg/h;

for iron: $55 \cdot 10^{-6} * 10 \cdot 10^{4} * 4.93 = 2.12$ kg/h.

The two additives being at 20% concentrations, the injections into the heavy fuel are:

1.68/0.20=8.4 kg/hour of magnesium additive; and 2.12/0.20=10.6 kg/hour of iron additive.

One can also inject an additive containing magnesium and iron in the atomic ratio Fe/Mg=2*4.5/9=1 (equation (30)).

Example No. 2

The same gas turbine as in Example No. 1 is considered, burning the same HFO with the same operating conditions (including the firing temperature of 1090° C.) and using the same conventional inhibitor as in Example No. 1. The application of the conventional inhibition method also leads to injecting 165 ppm of magnesium, in the form of an oil soluble additive containing 20 percent magnesium by weight, and to also performing a washing of the turbine every 170 hours of operation.

The firing temperature of this turbine increases from 1090 to 1160° C. (i.e., an increase of 70° C.). It is observed that the rate of fouling is multiplied by a factor 1.7, which leads to performing the washing of the turbine every 100 hours (i.e. approximately every 4 days), which considerably degrades the availability of this equipment.

It is now desired to maintain the firing temperature at 1160° C. and, to that end, it is decided to replace the conventional inhibition method (m=12.6; a=0) by a method with double oxides using aluminum and iron as second oxides. The fouling rate must be reduced by a factor 1.7 with regard to the conventional treatment realized at 1160° C. The anti-deposition efficiency (ADE) to be attained is thus 100*(1−1/1.7)=41 percent.

In this new treatment, magnesium is associated with aluminum and iron, metals whose relative atomic fractions are: $x_{Fe}=0.4$ and $x_{Al}=0.6$, values which also equal the relative molar fractions of oxides $Al_2O_3$ and $Fe_2O_3$ (respectively $x_1$ and $x_2$) that will be formed by reaction in the flames of the Al- and Fe-based additives. Moreover, to preserve optimal anti-corrosion protection, it is decided to retain the value of the dosage ratio of magnesium (m=12.6). Thus, the inhibition is carried out according to the equation:

$V_2O_5+12.6MgO+0.4*aAl_2O_3+$
$0.6*aFe_2O_3 \rightarrow Mg_3V_2O_8+0.4*aMgAl_2O_4+$
$0.6*aMgFe_2O_4+eMgO$ (31)

where: e=12.6−a−3.

We have, according to a calculation already carried out for $x_1=0.4$ and $x_2=0.6$:

$MV=4.02; HK=830;$ and considering that T=1433K (1160° C.), we have: K=1.092.

In these conditions, the criterion of low deposition (1/(1+K) (m−2)<a) which corresponds to an ADE of the order of magnitude of 50 percent can be written, for T=1160° C.:

$a \leq 0.478(m-2)=5.07.$

Since the initial target is for an ADE of at least 41 percent, one can take for example the value a=5.07 which corresponds to ADE≈50 percent. Thus, the excess of magnesium is: e=(12.6−5.07−3)=4.53, which is a very comfortable value for the safety of the inhibition.

Consequently, the equation (31) related to this inhibition method can be written:

$V_2O_5+12.6MgO+2.028Al_2O_3+$
$3.042Fe_2O_3 \rightarrow Mg_3V_2O_8+2.028MgAl_2O_4+$
$3.042MgFe_2O_4+4.53MgO.$ (31b)

For example, we can use an oil soluble inhibitor additive in which the magnesium, aluminum and iron will be in the atomic proportions corresponding to this reaction, that is: Mg/Al/Fe=1/0.322/0.483, or alternatively expressed in the weight proportions: Mg/Al/Fe=1/0.36/1.12 and, for example, an additive at 15 percent Mg, 5.4 percent Al, and 16.1 percent Fe in mass.

Exemplary embodiments of a method of inhibiting the vanadic corrosion of gas turbine hot parts are described above in detail. The embodiments provide additional advantages in reducing the formation of deposits in the gas turbine system and avoiding erosion of the hot parts of the gas turbine. The methods are not limited to the specific embodiments described herein, but rather, steps of the method may be utilized independently and separately from other steps described herein. For example, the methods may also be used in combination with other combustion systems and methods, and are not limited to practice with only the gas turbine as described herein. Rather, it should be understood that the exemplary embodiment can be implemented and utilized in connection with many other combustion system applications.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of inhibiting vanadic corrosion of a hot part of a gas turbine system comprising an expansion turbine and a combustor, wherein the combustor burns a fuel contaminated with vanadium such that vanadium pentoxide ($V_2O_5$) is formed, said method comprising:

introducing, in the combustor, a first oxide comprising magnesium oxide (MgO) and at least one second oxide from among $Al_2O_3$, $Fe_2O_3$, $TiO_2$ and $SiO_2$, a ratio "m" of a number of moles of MgO to a number of moles of $V_2O_5$ and a ratio "a" of a total number of moles of the at least one second oxide to the number of moles of $V_2O_5$ satisfying the two conditions:

$$a+3<m<15; \text{ and} \quad (i)$$

$$[1/(1+K)](m-2)<a<[10/(10+K)](m-2); \quad (ii)$$

wherein K is defined by the relation K=MV*HK*$e^{(-0.056*T)}$, where:
T is a firing temperature of the expansion turbine;
MV is an average density of one or more double oxides formed by a reaction between MgO and the at least one second oxide; and
HK is an average Knoop hardness of the one or more double oxides formed by the reaction between MgO and the at least one second oxide.

2. A method in accordance with claim 1, wherein the ratios "m" and "a" satisfy the relation:

$$m \geq a+3.5.$$

3. A method in accordance with claim 1, wherein the ratios "m" and "a" satisfy the relation:

$$[2/(2+K)](m-2)<a<[5/(5+K)](m-2).$$

4. A method in accordance with claim 1, wherein m=9 and a=4.5.

5. A method in accordance with claim 1, wherein the second oxide comprises $Al_2O_3$ and the ratios "m" and "a" satisfy the relation:

$$0.343(m-2)<a<0.839(m-2).$$

6. A method in accordance with claim 1, wherein the second oxide comprises $Fe_2O_3$ and the ratios "m" and "a" satisfy the relation:

$$0.408(m-2)<a<0.874(m-2).$$

7. A method in accordance with claim 1, wherein the second oxide comprises $TiO_2$ and the ratios "m" and "a" satisfy the relation:

$$0.563(m-2)<a<0.928(m-2).$$

8. A method in accordance with claim 1, wherein the second oxide comprises $SiO_2$ and the ratios "m" and "a" satisfy the relation:

$$0.617(m-2)<a<0.942(m-2).$$

9. A method in accordance with claim 1, wherein the firing temperature is selected to be one of (i) a temperature of a liner or transition part of the combustor; (ii) a temperature of a first stage nozzle of the expansion turbine; (iii) a temperature of a first stage bucket of the expansion turbine; (iv) an average between a temperature of gases exiting the combustor and any one of the temperatures described in (i), (ii) or (iii); and (v) a temperature of gases from the combustor at their entry into the expansion turbine.

10. A method in accordance with claim 9, wherein the firing temperature is increased by a safety increment.

11. A method in accordance with claim 1, wherein the at least one second oxide comprises two or more second oxides from among the group $Al_2O_3$, $Fe_2O_3$, $TiO_2$ and $SiO_2$, and wherein $$MV=\Sigma[(x_i*M_i)/(x_i*M_i/MV_i)];$$

$$HK=\Sigma(x_i*HK_i);$$

$x_i$ is a relative molar fraction of the second oxide i of the two or more second oxides;
$M_i$ is a molar mass of a double oxide formed from the second oxide i of the two or more second oxides;
$MV_i$ is a density of the double oxide formed from the second oxide i of the two or more second oxides; and
$HK_i$ is a Knoop hardness of the double oxide formed from the second oxide i of the two or more second oxides.

12. A method of reducing the formation of deposits in a gas turbine system comprising an expansion turbine and a combustor, wherein the combustor burns a fuel contaminated with vanadium such that vanadium pentoxide ($V_2O_5$) is formed, said method comprising:

introducing, in the combustor, a first oxide comprising magnesium oxide (MgO) and at least one second oxide from among $Al_2O_3$, $Fe_2O_3$, $TiO_2$ and $SiO_2$, a ratio "m" of a number of moles of MgO to a number of moles of $V_2O_5$ and a ratio "a" of a total number of moles of the at least one second oxide to the number of moles of $V_2O_5$ satisfying the two conditions:

$$a+3<m<15; \text{ and} \quad (i)$$

$$[1/(1+K)](m-2)<a<[10/(10+K)](m-2); \quad (ii)$$

wherein K is defined by the relation K=MV*HK*$e^{(-0.056*T)}$, where:
T is a firing temperature of the expansion turbine;
MV is an average density of one or more double oxides formed by a reaction between MgO and the at least one second oxide; and
HK is an average Knoop hardness of the one or more double oxides formed by the reaction between MgO and the at least one second oxide.

13. A method in accordance with claim 12, wherein the ratios "m" and "a" satisfy the relation:

$$m \geq a+3.5.$$

14. A method in accordance with claim 12, wherein the ratios "m" and "a" satisfy the relation:

$$[2/(2+K)](m-2)<a<[5/(5+K)](m-2).$$

15. A method in accordance with claim 12, wherein m=9 and a=4.5.

16. A method in accordance with claim 12, wherein the second oxide comprises $Al_2O_3$ and the ratios "m" and "a" satisfy the relation:

$$0.343(m-2)<a<0.839(m-2).$$

17. A method in accordance with claim 12, wherein the second oxide comprises $Fe_2O_3$ and the ratios "m" and "a" satisfy the relation:

$$0.408(m-2)<a<0.874(m-2).$$

18. A method in accordance with claim 12, wherein the firing temperature is selected to be one of (i) a temperature of a liner or transition part of the combustor; (ii) a temperature of a first stage nozzle of the expansion turbine; (iii) a temperature of a first stage bucket of the expansion turbine; (iv) an average between a temperature of gases exiting the combustor and any one of the temperatures described in (i), (ii) or (iii); and (v) a temperature of gases from the combustor at their entry into the expansion turbine.

19. A method in accordance with claim 12, wherein the firing temperature is increased by a safety increment.

20. A method in accordance with claim 12, wherein the at least one second oxide comprises two or more second oxides from among the group $Al_2O_3$, $Fe_2O_3$, $TiO_2$ and $SiO_2$, and wherein $$MV=\Sigma[(x_i*M_i)/(x_i*M_i/MV_i)];$$

$$HK=\Sigma(x_i*HK_i);$$

$x_i$ is a relative molar fraction of the second oxide i of the two or more second oxides;

$M_i$ is a molar mass of a double oxide formed from the second oxide i of the two or more second oxides;

$MV_i$ is a density of the double oxide formed from the second oxide i of the two or more second oxides; and $HK_i$ is a Knoop hardness of the double oxide formed from the second oxide i of the two or more second oxides.

* * * * *